United States Patent
Desai

(10) Patent No.: US 10,942,867 B2
(45) Date of Patent: Mar. 9, 2021

(54) CLIENT-SIDE CACHING FOR DEDUPLICATION DATA PROTECTION AND STORAGE SYSTEMS

(71) Applicant: EMC IP Holding Company LLC, Hopkinton, MA (US)

(72) Inventor: Keyur Desai, Cary, NC (US)

(73) Assignee: EMC IP Holding Company LLC, Hopkinton, MA (US)

(*) Notice: Subject to any disclaimer, the term of this patent is extended or adjusted under 35 U.S.C. 154(b) by 190 days.

(21) Appl. No.: 16/033,124

(22) Filed: Jul. 11, 2018

(65) Prior Publication Data
US 2020/0019514 A1 Jan. 16, 2020

(51) Int. Cl.
G06F 12/122 (2016.01)
G06F 12/123 (2016.01)
G06F 12/0815 (2016.01)
G06F 16/174 (2019.01)
G06F 12/0882 (2016.01)

(52) U.S. Cl.
CPC ........ *G06F 12/122* (2013.01); *G06F 12/0815* (2013.01); *G06F 12/123* (2013.01); *G06F 16/1748* (2019.01); *G06F 12/0882* (2013.01); *G06F 2212/1016* (2013.01)

(58) Field of Classification Search
CPC .. G06F 12/122; G06F 16/1748; G06F 12/123; G06F 12/0815; G06F 2212/1016; G06F 12/0882
See application file for complete search history.

(56) References Cited

U.S. PATENT DOCUMENTS

| | | | | |
|---|---|---|---|---|
| 10,061,775 | B1* | 8/2018 | Tripathi | G06F 16/50 |
| 10,440,142 | B2* | 10/2019 | Menai | H04L 67/2852 |
| 2013/0013844 | A1* | 1/2013 | Venkatesh | G06F 16/172 711/6 |
| 2013/0073809 | A1* | 3/2013 | Antani | G06F 12/121 711/136 |
| 2014/0115244 | A1* | 4/2014 | Maybee | G06F 12/0897 711/105 |
| 2014/0115260 | A1* | 4/2014 | Maybee | G06F 12/123 711/136 |
| 2014/0115261 | A1* | 4/2014 | Maybee | G06F 12/0897 711/136 |
| 2020/0142970 | A1* | 5/2020 | Madan | G06F 16/1748 |

OTHER PUBLICATIONS

Megiddo, Nimrod, and Dharnnendra S. Modha. "ARC: A Self-Tuning, Low Overhead Replacement Cache." FAST. vol. 3. No. 2003. 2003. (Year: 2003).*

* cited by examiner

*Primary Examiner* — Francisco A Grullon
(74) *Attorney, Agent, or Firm* — Staniford Tomita LLP

(57) ABSTRACT

A system performing client-side caching of data in a deduplication backup system by maintaining an Adaptive Replacement Cache (ARC) to pre-populate cached data and flush incrementals of the cached data in a client coupled to a backup server in the system. The system maintains cache consistency among clients by a time-to-live (TTL) measurement associated with each entry in a respective client cache, and a retry on stale entry mechanism to signal from the server when a cache entry is stale in a client due to change of a corresponding cache entry in another client. The ARC cache keeps track of both frequently used and recently used pages, and a recent eviction history for both the frequently used and recently used pages.

20 Claims, 7 Drawing Sheets

CLIENT-SIDE CACHING FOR DEDUPLICATION DATA PROTECTION AND STORAGE SYSTEMS

TECHNICAL FIELD

Embodiments are deduplication data protection and storage systems, and more specifically to performing client-side caching using an adaptive replacement cache.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Deduplication backup systems, such as EMC's Data Domain platform, reduce the disk space required to store disk-based backups by not saving duplicative data sets. Traditional deduplication backup systems are target-based in which data is copied from source servers to a backup target and deduplicated either as it is written to the target (inline deduplication) or after writing to the target (post-process deduplication).

Methods have been developed to increase backup performance by adopting a distributed approach to the deduplication process. One such product is EMC's Data Domain Boost ("DD Boost" or "Boost"), which distributes parts of the deduplication process to the backup server or application clients, enabling client-side deduplication for faster, more efficient backup and recovery. This eliminates the need for the backup server or application client to send all data (unique or redundant) to the backup system for deduplication processing. With DD Boost, the server only sends unique data segments to a Data Domain (or other deduplication) system, thus increasing the aggregate throughput (e.g., by up to 50 percent) and reducing the amount of data transferred over the network (e.g., by over 80 percent).

The DD Boost system generally provides performance improvements during backup and restore operations through re-population of the cache, such as by storing hashes of data during the cache flushes. By storing just the fingerprints of large data elements during a cache flush, the system has a reference to that data during cache re-population, and the use of fingerprints saves a great deal of space in the cache. However, in current systems, the re-population of the cache is performed only in response to a client request for the data. If the data is not on the server, there is still a delay in retrieving the data. Thus, there are instances where the cache is only populated after a client request is made, which slows overall system performance. Also, in this case, all data including both changed and unchanged data may be searched, further increasing the data access time.

Furthermore, maintaining client-side cache consistency can also be problematic. For example, if one client changes the file handle on the server (e.g., delete a file) and if the other client has that file handle cached, the changes may not get reflected immediately on the second client. Hence, the file handle in the cache of the second client may be stale.

What is needed, therefore, is a system that caches data and references to the data (fingerprints) on the client-side. Such caching of data would eliminate the need to go to the backup system and caching reference to the data would aid in fast re-populating of client side cache, and hence improve client-side deduplication performance. What is further needed is a cache system that processes only incremental data to populate or pre-populate the cache with data that has changed versus data that has not changed. What is yet further needed is a method of performing client-side caching of data, such as by using an Adaptive Replacement Cache (ARC) for caching heuristics and using client-side retry logic to maintain cache consistency.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, Data Domain Restorer, and Data Domain Boost are trademarks of Dell/EMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

Figure 1:
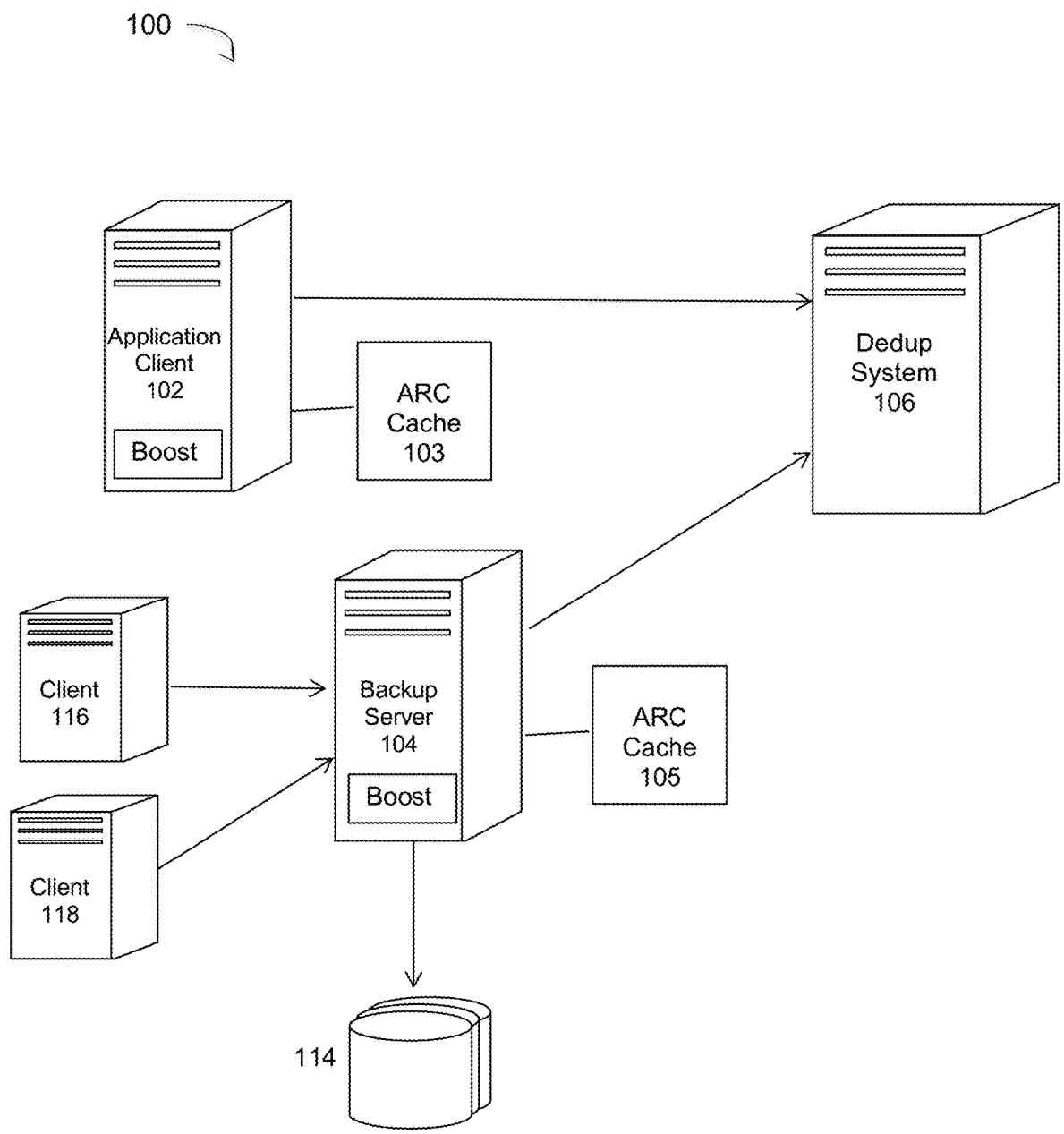
FIG. 1 is a diagram of a large-scale network implementing a client-side deduplication backup system and client-side caching, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve automated backup techniques in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

FIG. 1 is a diagram of a large-scale network implementing a client-side deduplication backup system and client-side caching, under some embodiments. In system 100, a backup server 104 stores backup data on one or more storage devices 114. The data sourced by a data source such as the client 116 and/or 118 may be any appropriate data, such as database data that is part of a database management system. In this case, the data may reside on one or more hard drives and may be stored in the database in a variety of formats. One example is an Extensible Markup Language (XML) database, which is a data persistence software system that allows data to be stored in XML format. Another example is a relational database management system (RDMS) which uses tables to store the information. The data may be stored in any number of persistent storage locations and devices, such as local client storage, server or network storage, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays. In an embodiment, the target storage devices, such as disk array 114 may represent any practical storage device or set of devices, such as fiber-channel (FC) storage area network devices, and OST (Open-Storage) devices.

In system, some of the components may be implemented using virtualization technology so that virtual machines (VMs) or other backup appliances couple to the server 104 directly and/or through a network, which may be a cloud network, LAN, WAN or other appropriate network. Such a network may be implemented using protocols such as Transmission Control Protocol (TCP) and/or Internet Protocol (IP), well known in the relevant arts. In a cloud-based network environment in which applications, servers and data are maintained and provided through a centralized cloud computing platform.

In an embodiment, backup server 104 may be coupled to or implemented as part of a DDR Deduplication Storage system 106 provided by EMC Corporation. However, other similar backup and storage systems are also possible. In a deduplication backup system, fingerprints or other compressed versions of backup data are sent to a deduplication server of system 106 for a comparison operation that determines whether any incoming data has already been stored or not. The deduplication implements a single-instance storage method that eliminates redundant copies of data to reduce storage needs by ensuring that only one unique instance of data is stored on the media 114. Any redundant or previously stored data blocks are replaced with pointers to the copy.

Depending on network configuration, the deduplication system 106 may be accessed by a backup server 104 that services clients 116 and 118 to perform the deduplication checks for these clients. Alternatively, deduplication system 106 may include a backup process so that it can service an application client 102 to perform the backup and deduplication processes in one processing platform. In most present systems, the deduplication and backup processes are server-based so that clients are only responsible for generating data to be backed up, and rely on the server (e.g., 106) or servers 104 and 106) to perform all of the tasks associated with deduplicating the data and backing it up to the storage media 114. Newer systems, however, have been developed to offload some of the deduplication tasks to the clients to take advantage of client resources, data locality, and generally speed the backup process.

System 100 may utilize certain protocol-specific namespaces that are the external interface to applications and include NFS (network file system) and CIFS (common internet file system) protocols, as well as DD Boost protocol provided by EMC Corporation. In general, DD Boost (Data Domain Boost) is a system that distributes parts of the deduplication process to the backup server or application clients, enabling client-side deduplication for faster, more efficient backup and recovery. A data storage deployment may use any combination of these interfaces simultaneously to store and access data. For an embodiment in which DD Boost is used, all relevant servers and clients execute Boost compatible programs. Thus, as shown in system 100, both application client 102 and backup server 104 executes a Boost program. In this context, both client 102 and server 104 are referred to as "Boost clients" even though one or of these components could be a server itself, such as backup server 104.

As stated earlier, the DD Boost software is designed to offload part of the deduplication process to a backup server or application client, which prevents the deduplication system 106 from having to carry the full burden of the deduplication workload. It is designed to increase backup speed while decreasing network bandwidth needs. The DD Boost system aggregates multiple links into dynamic interface groups between the application and the deduplication system (e.g., EMC Data Domain system) 106. The deduplication system 106 then transparently balances the backup load between links in the group and automatic link failover keeps backup jobs operational in case of temporary network glitches. In addition, the deduplication system can improve network utilization by dynamically routing clients between networks. This allows backup administrators to control replication between multiple deduplication systems from a single point of management to track all backups and duplicate copies.

Data Domain Boost is generally a software program that is available for all Data Domain systems. In a standard implementation, DD Boost is made up of two components: a DD Boost plug-in that runs on the backup server 104 or client 102 and a DD Boost component that runs on the deduplication system 106. All connectivity between components uses industry standard Ethernet or Fibre Channel. DD Boost software enables tight integration with backup and enterprise applications using an optimized transport. DD Boost includes three main features. The first is distributed segment processing, which distributes parts of the deduplication process from the Data Domain system to the backup server or client, increasing backup application performance. The second is managed file replication, which allows backup applications to manage Data Domain replication with full catalog awareness. The third is advanced load balancing and link failover, which provides link aggregation for load balancing and link failover, which eliminates the need for network layer aggregation. With DD Boost and managed file replication, backup administrators can control the backup, restore, and replication of the backup images written to Data Domain deduplication systems from the backup application console in a catalog-aware manner.

As is known, caching is a general technique used in data backup systems to temporarily store frequently used data. Some examples of cache use are as follows: (1) applications will sometimes walk down a directory tree looking for a file, and each lookup requires that the file handle for the previously fetched folder location be re-fetched since it is not cached between calls; (2) file and directory attributes can be cached to avoid repeated calls to the DDR; (3) certain file locality data (e.g., locality containers) can be cached to improve restore performance; and (4) readdir calls can be executed on many directories, i.e., caching readdir calls on the clients for individual directories may prevent making calls to get this data from the server. Embodiments include having a cache on a Boost client with ARC caching heuristics to help improve performance in the scenarios listed above, i.e., data is cached using the semantics of the ARC (MFU/ghost list, etc.).

As stated above, present implementations of DD Boost systems do not cache file path handles, so that every time the file systems needs to access a file, it goes to the DDR and gets the file path and its handle. Maintaining client side cache consistency is also an issue in present systems. Embodiments include a cache mechanism that caches file path handles on the client to eliminate the need to go to the DDR and hence improve Boost performance. The same level of caching logic applied to other client side data, such as file attributes, readdir data, and so on.

Embodiments include implementing client-side caching of data, using Adaptive Replacement Cache (ARC) for caching heuristics and using client side retry logic to maintain cache consistency. In an embodiment, an ARC cache will reside on all the places where DDBoost resides, i.e. application clients, backup servers, other DDBoost clients. Thus, for system 100 shown in FIG. 1, an ARC cache 103 is associated with application client 102 and ARC cache 105 is associated with backup server 104. A different cache or instantiation of the cache may be so associated with any other DDBoost client within the system also. The ARC cache may be embodied as a separate physical cache memory within or coupled to each DDBoost client, such as shown for ARC caches 103 and 105, or it may be implemented as a central cache memory that is accessible by all DDBoost clients through a network (e.g., cloud or LAN) connection, or it may be embodied as separate partitions within a central cache or centralized storage media. In general, the ARC cache is implemented in fast memory devices, as are normal network caches.

The ARC cache provides a performance improvement over existing systems by providing a mechanism whereby the system can pre-populate and store data segments using a ghost list structure in the cache. As stated above, current caches are populated only upon a client request, thus populating the cache with all data, changed or unchanged, after it is indicated as needed, thus slowing the process and potentially taking up unnecessary cache space. Using the ARC cache mechanism in a DD Boost client allows the cache to be pre-populated with only incremental (changed) data, therefore, the system does not need to wait for the client to make the request to make before populating cache, and it can be used to flush only that data that is changed (incrementals). It also allows for effective maintenance of cache consistency, through mechanisms such as Time-To-Live (TTL) measures and stale (ESTALE) retries.

By introducing a novel client side caching method and system, backup and restore performance of client side software like DDBoost can be greatly improved. Frequently accessed data can be cached on the client side cache, which will improve performance both during backup and restores. Data with small footprint like file handles, attributes etc. can be cached directly. Data with large footprints can store their fingerprints (hash of data) in the cache and these fingerprints can be used during re-population and flushing of cache.

Cache Design

Various caching algorithm exist and can be used under certain embodiments to implement the cache 114 of system 100. These include Least Frequently Used (LFU), Least Recently Used (LRU), and Adaptive Replacement Cache (ARC), which is a combination of LRU and LFU caches.

The Least Frequently Used (LFU) is a type of cache algorithm used to manage memory within a computer. The standard characteristics of this method involve the system keeping track of the number of times a block is referenced in memory. When the cache is full and requires more room, the system will purge the item with the lowest reference frequency. The simplest method to employ an LFU algorithm is to assign a counter to every block that is loaded into the cache. Each time a reference is made to that block the counter is increased by one. When the cache reaches capacity and has a new block waiting to be inserted the system will search for the block with the lowest counter and remove it from the cache. While the LFU method may seem like an intuitive approach to memory management it is not without faults. Consider an item in memory which is referenced repeatedly for a short period of time and is not accessed again for an extended period of time. Due to how rapidly it was just accessed its counter has increased drastically even though it will not be used again for a decent amount of time. This leaves other blocks which may actually be used more frequently susceptible to purging simply because they were accessed through a different method. Moreover, new items that just entered the cache are subject to being removed very soon again, because they start with a low counter, even though they might be used very frequently after that. Due to major issues like these, a pure LFU system is fairly uncommon; instead, systems generally favor hybrids that utilize LFU concept.

The Least Recently Used (LRU) algorithm discards the least recently used items first. This algorithm requires keeping track of what was used when, which is expensive if one wants to make sure the algorithm always discards the least recently used item. General implementations of this technique require keeping "age bits" for cache-lines and track the "Least Recently Used" cache-line based on age-bits. In such an implementation, every time a cache-line is used, the age of all other cache-lines changes.

The Adaptive Replacement Cache (ARC) constantly balances between LRU and LFU, to improve the combined result. This is accomplished by keeping track of both frequently used and recently used pages plus a recent eviction history for both. A basic LRU maintains an ordered list (the cache directory) of resource entries in the cache, with the sort order based on the time of most recent access. New entries are added at the top of the list, after the bottom entry has been evicted. Cache hits move to the top, pushing all other entries down. ARC improves the basic LRU strategy by splitting the cache directory into two lists, T1 and T2, for recently and frequently referenced entries. In turn, each of these is extended with a "ghost" list (B1 or B2), which is attached to the bottom of the two lists. In general, a ghost list is a reference to data, such as a fingerprint of the data. These ghost lists act as scorecards by keeping track of the history of recently evicted cache entries, and the algorithm uses ghost hits to adapt to recent change in resource usage. Note that the ghost lists only contain metadata (keys for the entries) and not the resource data itself, i.e. as an entry is evicted into a ghost list its data is discarded.

Figure 2:
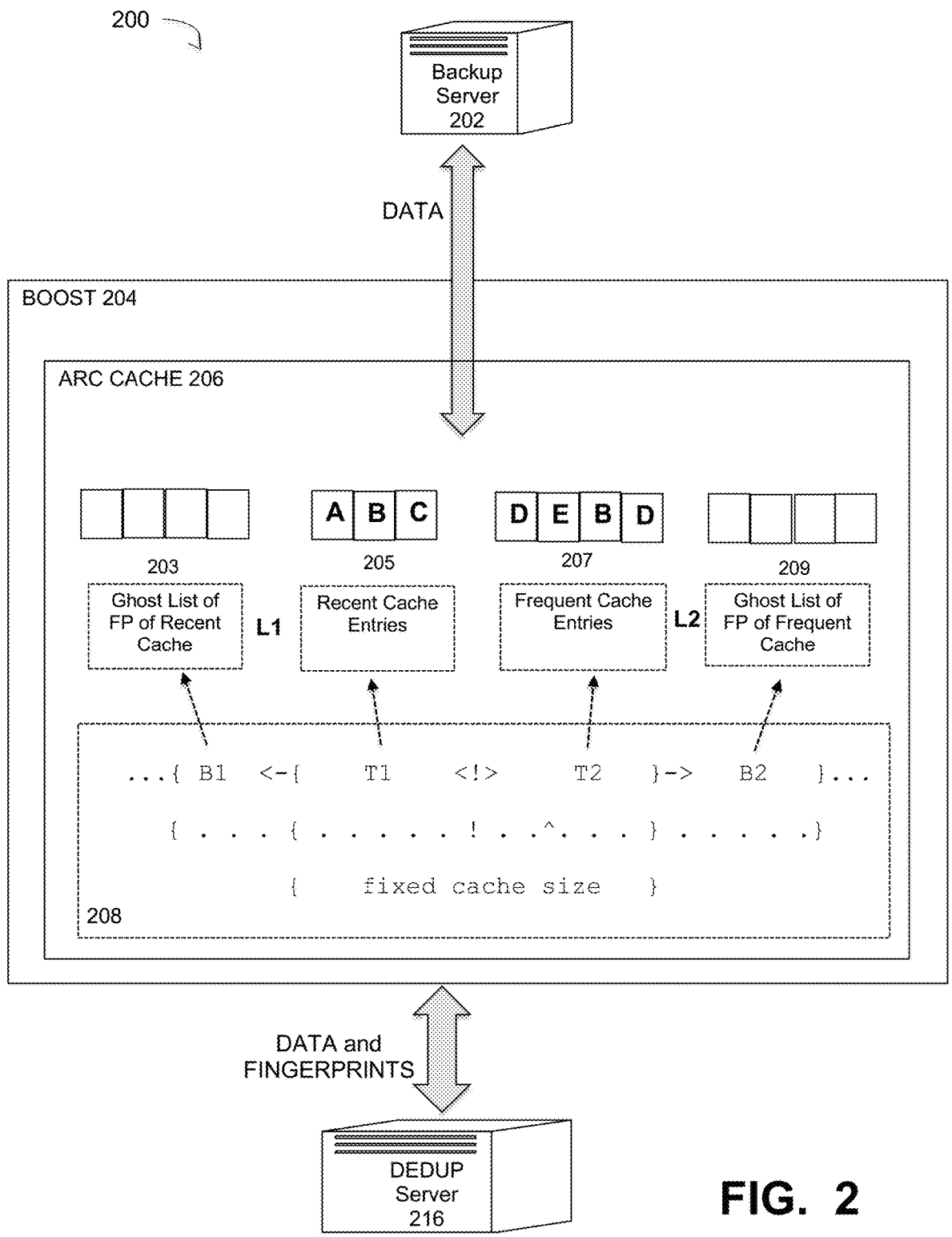
FIG. 2 illustrates an implementation and function of a client-side cache under some embodiments.

FIG. 2 illustrates an implementation and function of a client-side cache used in a DD Boost system, under some embodiments. The ARC cache of FIG. 2 can represent one or both of ARC cache 103 or 105 of FIG. 1. In system 200 of FIG. 2, a backup server 202 (or application client, e.g., 102) has or accesses a boost program 204, which incorporates ARC cache 206. The ARC cache 206 may be embodied in any appropriate fast memory storage device for temporarily storing frequently or recently used data, according to known methods. The cache allows a process, such as a backup process in server 202 to quickly access data based on certain criteria to prevent the need to go to slower mass storage devices, such as SAN or NAS storage 114.

For the embodiment of FIG. 2, the cache 206 is divided into sets of storage locations, such as locations 205 that stores recent cache entries, and 207 that stores frequent cache entries. In an example embodiment, cache 206 is shown as storing example data blocks A, B, and C in as recently cache entries 203, and data blocks D, E, B, and D (again) as frequent cache entries 207. It should be noted that this illustration represents a simplified example for purposes of explanation only, and that actual implementation may vary according to embodiments. Associated with each of the recent and frequent cache entries is a corresponding ghost list of fingerprints for each section of the cache. Thus, a ghost list of fingerprints (FP) of the recent cache 203 is associated with recent cache entries 205, and a ghost list of fingerprints (FP) of the frequent cache 209 is associated with frequent cache entries 207.

As stated above, the ARC cache 206 keeps track of both frequently used and recently used pages plus a recent eviction history for both. ARC splits an LRU cache directory into two lists, T1 and T2, for recently and frequently referenced entries. In turn, each of these is extended with a ghost list (B1 or B2), which is attached to the bottom of the two lists, where a ghost list comprises a fingerprint (or other reference) list of the data. Data element 208 illustrates a linear representation of the ARC cache 206 in an illustrative embodiment. As shown, the combined cache directory is organized in four LRU lists:

1) T1, for recent cache entries.
2) T2, for frequent entries, referenced at least twice.
3) B1, ghost entries recently evicted from the T1 cache, but are still tracked.
4) B2, similar ghost entries, but evicted from T2.

As stated above, the ARC cache 206 keeps track of both frequently used and recently T1 and B1 together are referred to as L1, a combined history of recent single references. Similarly, L2 is the combination of T2 and B2. Thus, as shown in FIG. 2:

L1=T1+B1
L2=T2+B2

As further shown in FIG. 2, the whole ARC cache can be visualized in a single line:

```
. . . { B1    <-{    T1     <-!->    T2    }-> B2   }. .
         {. . . .{. . . . . . !. .^. . . .} . . . .}
              {  fixed cache size (c)  }
```

In the above data structure example, the inner { } brackets indicate actual cache, which although fixed in size, can move freely across the B1 and B2 history. L1 is now displayed from right to left, starting at the top, indicated by the ! marker, ^ indicates the target size for T1, and may be equal to, smaller than, or larger than the actual size (as indicated by !).

New entries enter T1, to the left of !, and are gradually pushed to the left, eventually being evicted from T1 into B1, and finally dropped out altogether. Any entry in L1 that gets referenced once more, gets another chance, and enters L2, just to the right of the central ! marker. From there, it is again pushed outward, from T2 into B2. Entries in L2 that get another hit can repeat this indefinitely, until they finally drop out on the far right of B2.

With respect to replacement, entries entering or re-entering the cache (T1,T2) will cause the ! marker to move towards the target marker ^. If no free space exists in the cache, this marker also determines whether either T1 or T2 will evict an entry. Hits in B1 will increase the size of T1, pushing ^ to the right. The last entry in T2 is evicted into B2. Hits in B2 will shrink T1, pushing ^ back to the left. The last entry in T1 is now evicted into B1. A cache miss will not affect ^, but the ! boundary will move closer to ^. An example in later in this description demonstrates the working of the cache under an example embodiment.

With respect to caching techniques on writes, there are three main caching techniques that can be deployed. The first technique is a write-through cache that directs write I/O (input/output) onto the cache and through to underlying permanent storage before confirming I/O completion to the host. This ensures data updates are safely stored on, for example, a shared storage array, but has the disadvantage that I/O still experiences latency based on writing to that storage. A write-through cache is good for applications that write and then re-read data frequently as data is stored in cache and results in low read latency.

The second is a write-around cache, which is a similar technique to write-through cache, but the write I/O is written directly to permanent storage, bypassing the cache. This can reduce the cache being flooded with write I/O that will not subsequently be re-read, but has the disadvantage is that a read request for recently written data will create a "cache miss" and have to be read from slower bulk storage and experience higher latency, The third is a write-back cache where write I/O is directed to cache and completion is immediately confirmed to the host. This results in low latency and high throughput for write-intensive applications, but there is data availability exposure risk because the only copy of the written data is in cache Suppliers may add resiliency with products that duplicate writes, but it needs to be considered whether write-back cache solutions offer enough protection as data is exposed until it is staged to external storage. In general, a write-back cache is the best performing solution for mixed workloads as both read and write I/O have similar response time levels. Embodiments utilize a cache that implements write-through caching semantics, though other embodiments are not so limited.

Figure 3:
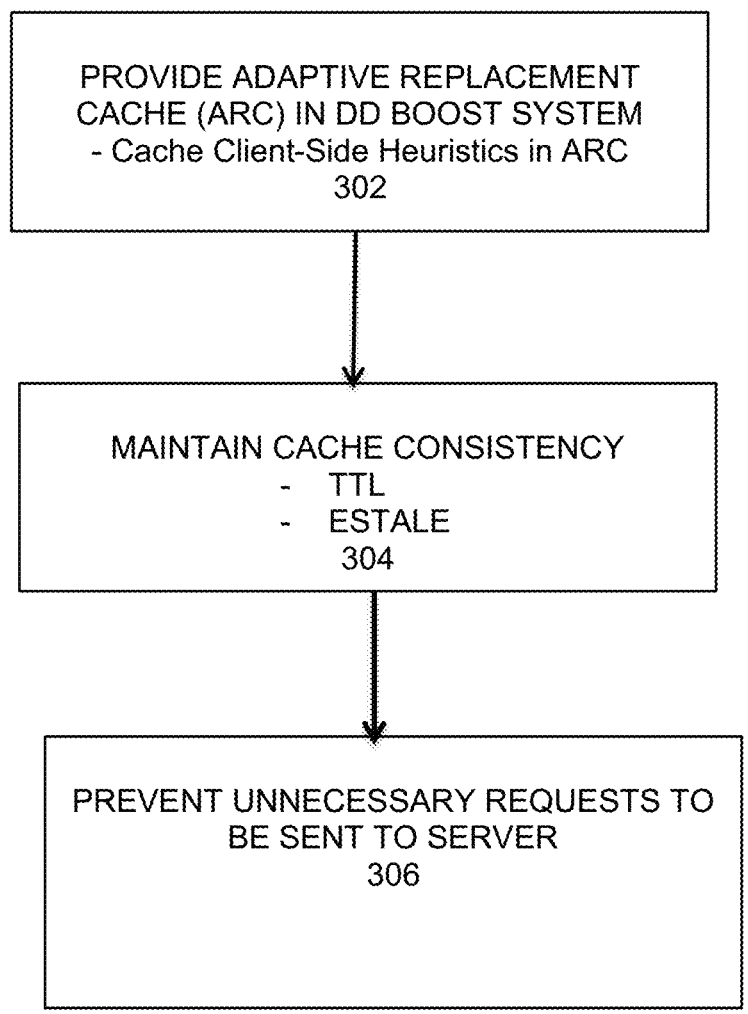
FIG. 3 is a flowchart illustrating a method of implementing a client side cache under some embodiments.

FIG. 3 illustrates a diagram of providing a client-side cache under certain embodiments. Embodiments of the client-side deduplication system 100 of FIG. 1 include an Adaptive Replacement Cache (ARC) that constantly balances between LRU and LFU, to improve the combined result, 302. It accomplishes this by keeping track of both frequently used and recently used pages plus a recent eviction history for both. Embodiments include a Boost caching technique that uses the ARC cache implementation with write-through semantics. Embodiments further include one or more cache consistency mechanisms, 304, such as a Time-To-Live (TTL) for each entry in the client cache, as described above. Having a client-side cache with the above caching heuristics and consistency mechanism generally help improve performance of the client-side deduplication (DD Boost) software. The above two mechanisms combined (1) caching heuristics on client side cache using ARC, and (2) maintaining cache consistency on individual client cache using retries on a stale error signal (ESTALE), represent the advantageous aspects of the described embodiments, and prevents unnecessary requests to be sent to the server, 306.

Lease/Delegation

Embodiments use certain file system caching mechanisms such as leases and delegations. In general, a lease allows clients to adjust their buffering policy to increase performance and reduce network use. The primary types of leases are (1) a read-caching lease that allows caching reads and can be shared by multiple clients, (2) a write-caching lease that allows caching writes and is exclusive to only one client, and (3) a handle-caching lease that allows caching handles and can be shared by multiple clients. A lease is similar to an opportunistic lock (oplock) mechanism, but provides greater flexibility for clients to request caching mechanisms. An opportunistic locks is a client caching mechanism that allows clients to dynamically decide the client-side buffering strategy so the network traffic can be minimized. For example, a client can buffer data for writing locally to reduce network packets if the client is notified there are no other processes accessing data. The same buffering can be done on reading, where data from a remote file is read ahead to reduce the round trips between the client and the server if the client knows that there are no other processes writing data to the file. Embodiments can use either leases or oplocks to provide certain client-side processing with respect to data buffering and caching, depend on the file system used (e.g., SMB, CIFS, NFS, and so on).

With respect to delegations, a network file system (NFS) server issues delegations to clients to allow client-side caching so that the client can cache data locally. This delegates responsibility of caching data to the client (delegation). NFS version 4 provides both client support and server support for delegation. File systems, such as NFS (v4) support delegation, in which the server delegates the management of a file to a client. For example, the server could grant either a read delegation or a write delegation to a client. Read delegations can be granted to multiple clients at the same time, whereas a write delegation can be granted to only one client due to conflicts. While holding a write delegation, the client would not send various operations to the server because the client is guaranteed exclusive access to a file. Similarly, the client would not send various operations to the server while holding a read delegation, as the server guarantees that no client can open the file in write mode. The effect of delegation is to greatly reduce the interactions between the server and the client for delegated files, thus reducing network traffic is reduced and improving client performance. The server rather than a client requests delegation, generally upon the access patterns for a file (e.g., by one client rather than multiple clients).

When a conflicting write access to the data cached on a particular client is received by the server, the NFS server will recall/break the delegation granted to the client. This will prompt flushing of cached data from the client to the server. During flushing of data, fingerprints of data can be stored on the client side cache, and these fingerprints can be stored in the ghost list of the ARC cache, as described in greater detail below.

Figure 4:
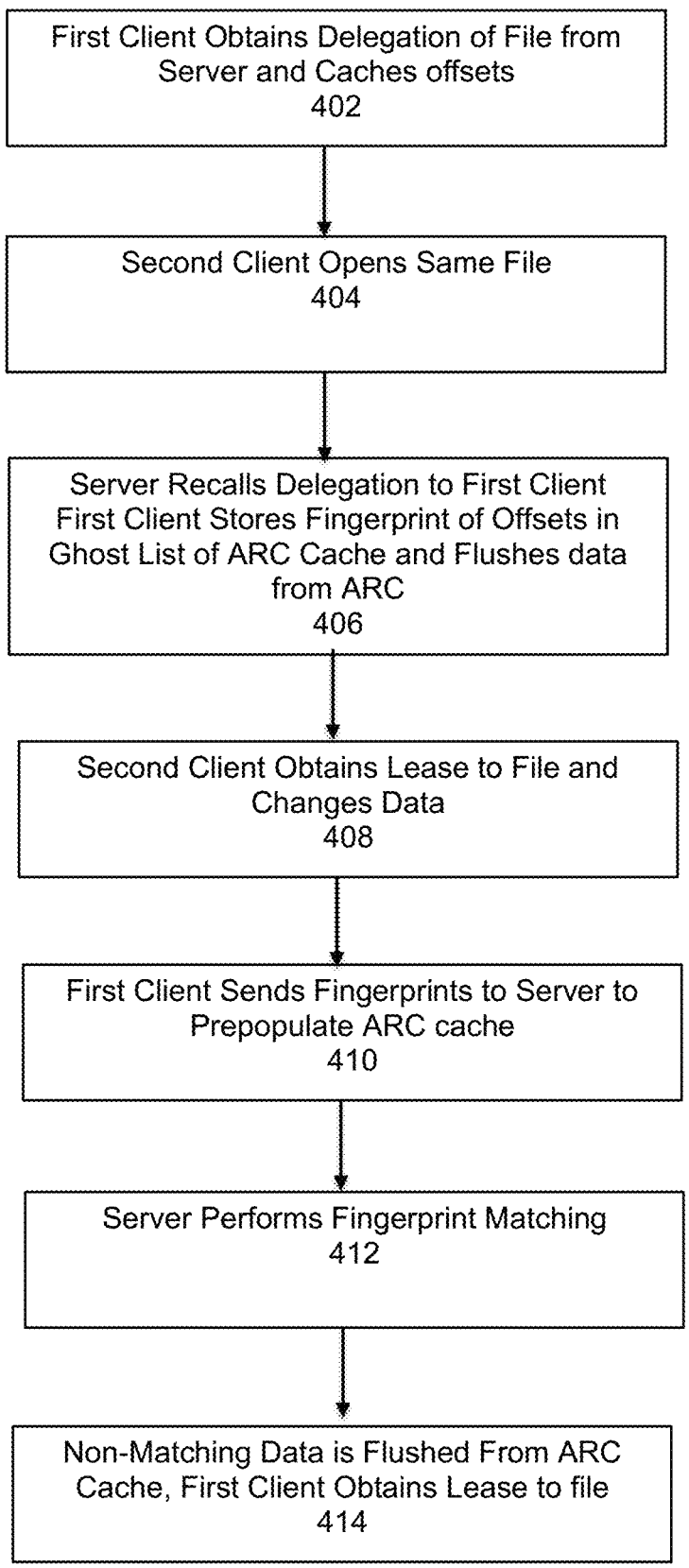
FIG. 4 is a flowchart illustrating a method of implementing a client side cache using delegation methods, under some embodiments.

FIG. 4 is a flowchart illustrating a method of implementing a client side cache using delegation methods, under some embodiments. As shown in FIG. 4, the process starts by a first client obtaining a delegation of a file (call it file fl.txt) from the server. It then caches the offsets for this file, 402. A second client then attempts to open the same fl.txt file, 404. In response, the server recalls the delegation to the first client, and the first client stores a fingerprint of the offsets in a ghost list of the ARC cache and flushes data from the ARC cache, 406. The second client obtains a delegation of the file from the server and changes any appropriate data, 408. The first client sends its fingerprints to the server to pre-populate the ARC cache, 410. The server then performs a fingerprint matching operation to determine if there is any duplicate data, such as through normal deduplication processes, 412. Any non-matching data is flushed from the ARC cache, and the first client obtains a lease to the file fl.txt, 414.

EXAMPLE EMBODIMENTS

Figure 5:
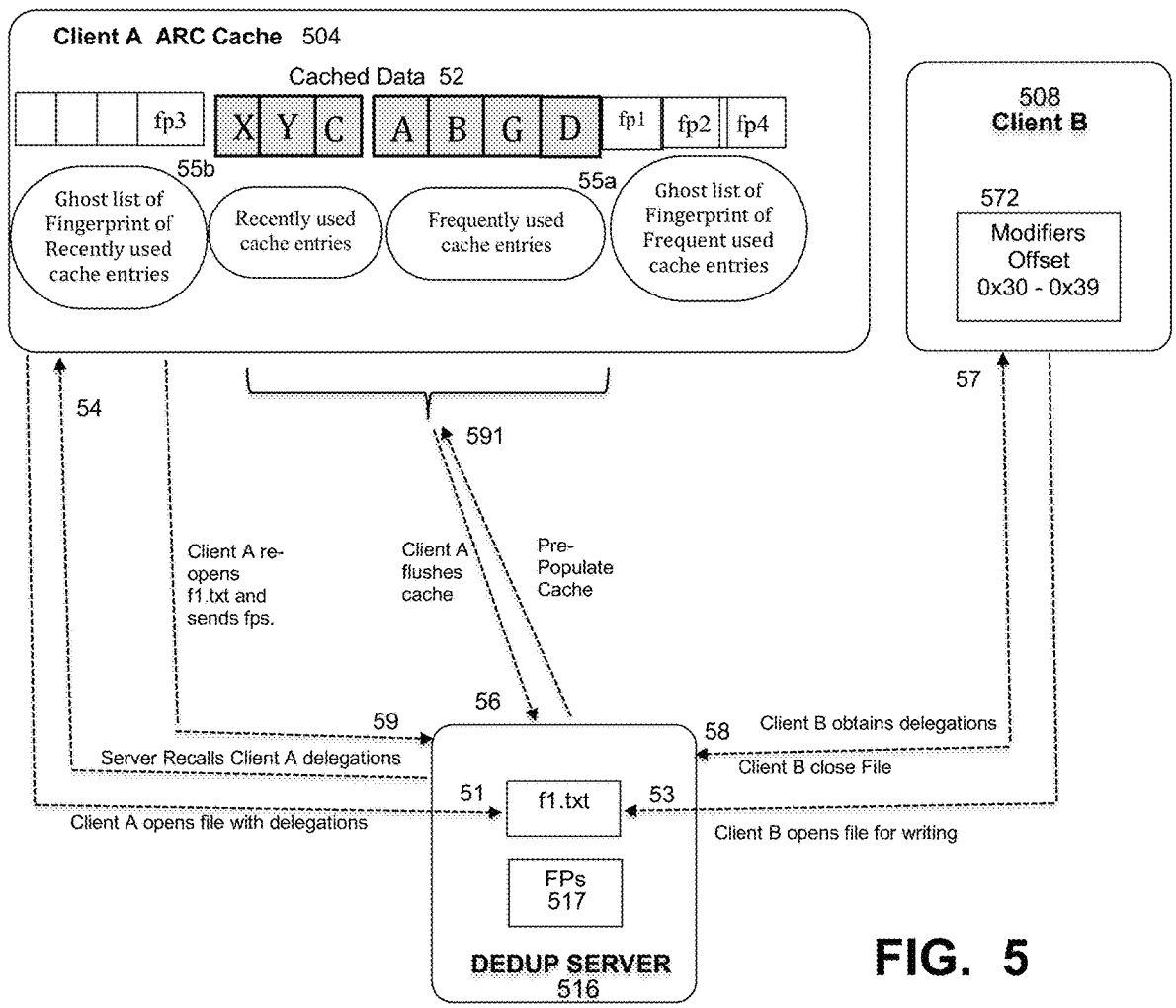
FIG. 5 is a flow diagram that illustrates a method of pre-populating an ARC cache through fingerprint filtering, under some embodiments.

Examples of an ARC cache implementation of application data caching and using client-side delegations/leasing are provided in Examples 1 and 2 below and with reference to FIGS. 5 and 6, respectively. These examples are provided for illustrative purposes only, and embodiments are not so limited. FIG. 5 is a flow diagram that illustrates a method of pre-populating an ARC cache through fingerprint filtering, under some embodiments. FIG. 5 illustrates how storing fingerprints of data in a ghost list of the ARC cache helps in pre-populating the ARC cache to improve performance of the overall data storage system.

FIG. 5 illustrates a flow diagram for transactions between a deduplication server 516 and two clients A having ARC cache 504 and client B 508. As shown in FIG. 5, a file fl.txt exists on a deduplication server 516. The example regions of the file fl.txt and corresponding fingerprints of the offsets are shown in data structure 502. As a first step in the pre-population process, client A obtains lease/delegation on file fl.txt from the server, step 51. Client A then caches the following data offsets in the most frequently used (MFU) and most recently used (MRU) sections of its ARC cache 504 to form cached data 52. That is, for the example shown:

0x10-0x19—Stored in MFU List
0x20-0x29—Stored in MFU list
0x30-0x39—Stored in MRU list
0x70-0x99—Stored in MFU list As shown in step 53, client B 508 wants to open the same file fl.txt from the server. In response, the server recalls the lease/delegation on file fl.txt from client A, step 54. The client A needs to flush data on the server, but before doing that, client A calculates fingerprint/hash of the offsets of the cached data in its MRU/MFU (most recently used/most frequently used) section and stores it in the ghost list (GMRU/GMFU) section of its ARC cache, where GMRU is the ghost list for the most recently used and GMFU is the ghost list for the most frequently used.

0x10-0x19—Fingerprint 1 (fp1) Stored in Ghost list for MFU
0x20-0x29—Fingerprint 2 (fp2) Stored in Ghost list for MFU
0x30-0x39—Fingerprint 3 (fp3) Stored in Ghost list for MRU
0x70-0x99—Fingerprint 4 (fp4) Stored in Ghost list for MFU These transactions are illustrated in FIG. 5 as 55*a* and 55*b*, in which within cached data 52, block A generates fp1, block B generates fp2 and block D generates fp4 in transaction 55*a* (for MFU), and block C generates fp3 in transaction 55*b* (for MRU entries). Client A flushes data from the MRU/MFU section (comprising blocks X Y C A B G D) of its ARC cache to the server, step 56. The ARC cache of client A still contains fingerprints of the data in its ghost list(s) (i.e., fp1, fp2, fp3, fp4). In step 57, client B manages to obtain lease on file fl.txt and changes data between offset 0x30-0x39 as shown in its data element 572. The rest of the data remains unchanged. Client B closes fl.txt and flushes data to the server, step 58. In this example scenario, client A wants to continue working on file fl.txt so it sends a request to obtain lease/delegation on file fl.txt to the server, along with the fingerprints in the ghost list of its ARC, step 59. The fingerprints in the ghost list can be compressed and batched together before sending it to server in this step 59. The ghost list from the ARC cache 504 on client A can send fp1, fp2, fp3 and fp4 to the server to pre-populate its ARC cache. As offsets of fp1, fp2 and fp4 did not have any change in data, a fingerprinting match occurs on the server and the data is pre-fetched from the server 516. The client A ARC cache 504 is thus pre-populated by the data pre-fetched from the server, step 591. As data corresponding to fp3 has changed on the server (by Client B), there will not be any fp3 match on the server and that data (and it fingerprint) is flushed from the ARC cache of client A. After the cache is pre-populated, client A obtains the lease/delegation on file fl.txt from the server. Since the client cache is pre-populated on Client A, it results in better performance in accessing unchanged data on Client A.

In an alternative embodiment, application of the ARC caching algorithm on client can be performed when the lease/delegations on a file are recalled by the server due to conflicting opening of a file, and the clients need to flush the ARC cache(s) and synchronize with the server. In this embodiment, the clients could send the fingerprint of the data first to the server and only flush the incrementals. FIG. 6 illustrates an example process of flushing an ARC cache during a delegation recall, under some embodiments. This figure comprises a flow diagram illustrating a method of using ARC cache semantics to flush only incremental data, under some embodiments, and uses the example scenario shown in FIG. 5, and like reference numbers refer to the same components or process steps.

Figure 6:
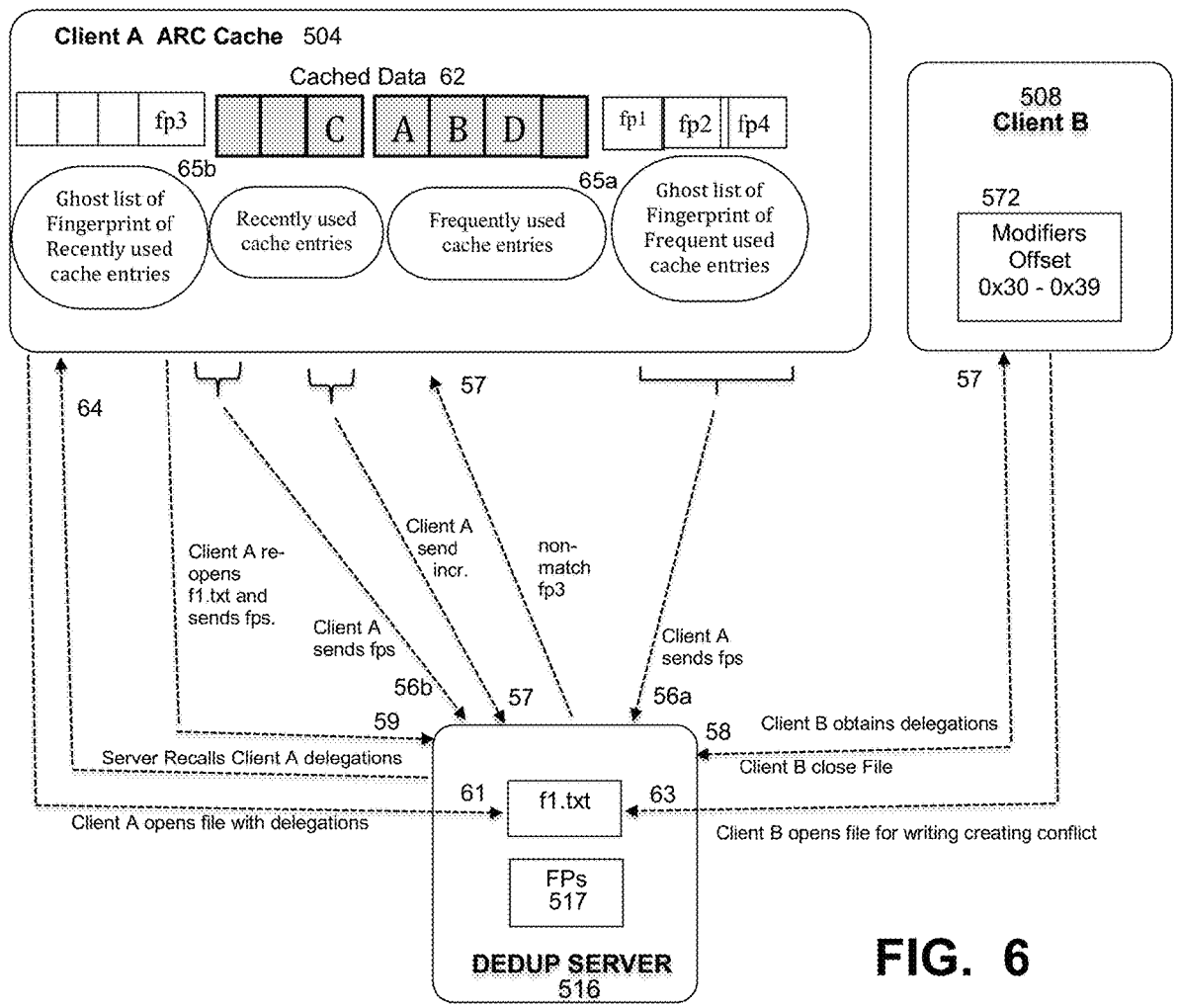
FIG. 6 is a flowchart illustrating a method of using ARC cache semantics to flush only incremental data, under some embodiments.

As shown in FIG. 6, client A already has lease/delegation on file fl.txt from the server 516, step 61. The client A cached data 62 in this example comprises data blocks C, A, B, and D. Client A has the following data offsets cached in the MRU/MFU section of its ARC cache 504:

0x10-0x19—Stored in MFU List
0x20-0x29—Stored in MFU list
0x30-0x39—Stored in MRU list
0x70-0x99—Stored in MFU list In step 63, client B wants to open the same file fl.txt from the server, which results in a conflicting open operation. The server 516 issues a recall lease/delegation on file fl.txt from client A, step 64. Client A needs to flush data to the server. But before doing that, client A calculates fingerprint/hash (if not already present in the ghost list) of the offsets of the cached data in its MRU/MFU section and stores it in the ghost list (GMRU/GMFU) section of its ARC cache. Thus in steps 65*a* and 65*b* client A stores:

0x10-0x19—Fingerprint 1 (fp1) Stored in Ghost list for MFU
0x20-0x29—Fingerprint 2 (fp2) Stored in Ghost list for MFU
0x30-0x39—Fingerprint 3 (fp3) Stored in Ghost list for MRU
0x70-0x99—Fingerprint 4 (fp4) Stored in Ghost list for MFU In steps 56*a* and 56*b*, as part of the flush operation, client A sends the fingerprint (fp1, fp2, fp3 and fp4) to the server 516. It should be noted that in this step only the fingerprints are sent and not the data. Fingerprints fp1, fp2 and fp4 from the GMFU are sent in step 56*a*, and fingerprint fp3 is sent in step 56*b* from GMRU. As in the example scenario for FIG. 5, it is assumed that offsets of fp1, fp2 and fp4 did not have any change in data. Only offset 0x30-0x39 on client A had some data modified (i.e., fp3 calculated from modified data).

In step 57, client A is notified of fingerprinting match results by the server, i.e., fp1, fp2 and fp4 matched on the server and fp3 did not match. As data associated with fp3 did not match, only data associated with fp3 (i.e., offset 0x30-0x39) is flushed to the server from client A, during the cache sync. As shown in FIG. 6, this is step 57 in which data block C (the only incremental) is flushed to the cache. In this manner, client A has to send only the incremental data to the server during cache flush due to recall of lease/delegation and its client side ARC cache 504 can remain populated to serve data to applications.

In the above examples, the offset sets can be fixed size or variable size, and can be set depending on system requirements and constraints. For example, for a 1 MB file, a fingerprint can be between 4K and 12K as the offset size.

In general, maintaining client-side cache consistency can be challenging. For example, if one client changes the file handle on the server (delete of a file) and if the other client has that file handle cached, the changes may not get reflected immediately on the second client. Hence, the file handle in the second client may be stale. To maintain client-side cache consistency, embodiments include a Time-To-Live (TTL) for each entry in the client cache. Once the TTL expires, the entry can be flushed from the cache. Embodiments also include a retry-on-stale entry mechanism. In the case above, if the second client tries to use the file handle from its cache, which is already STALE, it will receive an ESTALE error from the server/DDR. In response to this error, the client would flush that entry from its cache and get the updated file handle entry from the server/DDR and update its cache. This way, cache consistency is maintained on individual client cache.

With client-side caching, if something changes on the server, data saved on two clients, updates may occur only on one client. The TTL associated with the cached data, e.g., a 10 second TTL for an offset saved in the cache; after 11 seconds the data is flushed and repopulated. This provides cache consistency across the two clients. Another way for consistency is an ESTALE signal, such as for a file handle stored on the server. Both clients cache the file handle. If client B deletes or renames the file to change the file handle, this results in stale data in client A. The server will return an ESTALE error in this case. This flushes the client A cache and repopulation to maintain consistency. The handle in this case is an identifier, such as a 16 or 32 bit pointer representation of the file. Either or both of the TTL and ESTALE mechanism can be used for cache consistency.

Example of an ARC Cache

As illustrated above, the ARC cache can be represented as:

```
    . . . { B1  <-{  T1   <-!->  T2   }-> B2 } . .
           { . . . . { . . . . . ! . . ^ . . . . } . . . . }
                     { fixed cache size (c) }
```

The above caching behavior can be demonstrated with an example using the linear cache representation 208 of FIG. 2. An example observes the cache behavior in terms of accessing 16 hexadecimal numbers (0x00 to 0x0f) into the cache.

```
get 04: { <-{ 04, <-!-> }-> }
get 0f: { <-{ 04,0f, <-!-> }-> }
get 02: { <-{ 04,0f,02, <-!-> }-> }
get 03: { <-{ 04,0f,02,03, <-!-> }-> }
get 0e: { 04, <-{ 0f,02,03,0e, <-!-> }-> }
get 0c: { 04, <-{ 0f,02,03,0e,0c, <-!-> }-> }
get 06: { 04, <-{ 0f,02,03,0e,0c,06, <-!-> }-> }
get 06: { 04, <-{ 0f,02,03,0e,0c, <-!-> 06, }-> }
get 0b: { 04, <-{ 0f,02,03,0e,0c,0b, <-!-> 06, }-> }
get 08: { 04,0f,02,03, <-{ 0e,0c,0b,08, <-!-> 06, }-> }
get 08: { 04,0f,02,03, <-{ 0e,0c,0b, <-!-> 08,06, }-> }
get 06: { 04,0f,02,03, <-{ 0e,0c,0b, <-!-> 06,08, }-> }
get 0b: { 04,0f,02,03, <-{ 0e,0c, <-!-> 0b,06,08, }-> }
get 02: { 04,0f,03, <-{ 0e,0c, <-!-> 02,0b,06,08, }-> }
get 0b: { 04,0f,03, <-{ 0e,0c, <-!-> 0b,02,06,08, }-> }
get 00: { 04,0f,03, <-{ 0e,0c,00, <-!-> 0b,02,06,08, }-> }
get 0b: { 04,0f,03, <-{ 0e,0c,00, <-!-> 0b,02,06,08, }-> }
get 0e: { 04,0f,03, <-{ 0c,00, <-!-> 0e,0b,02,06,08, }-> }
get 0f: { 04,03, <-{ 0c,00, <-!-> 0f,0e,0b,02,06, }-> 08, }
get 03: { 04, <-{ 0c,00, <-!-> 03,0f,0e,0b,02, }-> 06,08, }
get 0e: { 04, <-{ 0c,00, <-!-> 0e,03,0f,0b,02, }-> 06,08, }
get 03: { 04, <-{ 0c,00, <-!-> 03,0e,0f,0b,02, }-> 06,08, }
get 0d: { 04, <-{ 0c,00,0d, <-!-> 03,0e,0f,0b, }-> 02,06,08, }
get 0d: { 04, <-{ 0c,00, <-!-> 0d,03,0e,0f,0b, }-> 02,06,08, }
get 0f: { 04, <-{ 0c,00, <-!-> 0f,0d,03,0e,0b, }-> 02,06,08, }
get 0b: { 04, <-{ 0c,00, <-!-> 0b,0f,0d,03,0e, }-> 02,06,08, }
get 00: { 04, <-{ 0c, <-!-> 00,0b,0f,0d,03,0e, }-> 02,06,08, }
get 08: { 04, <-{ 0c, <-!-> 08,00,0b,0f,0d, }-> 03,0e,02, }
get 09: { 04, <-{ 0c,09, <-!-> 08,00,0b,0f,0d, }-> 03,0e,02, }
get 04: { <-{ 0c,09, <-!-> 04,08,00,0b,0f, }-> 0d,03,0e,02, }
get 03: { <-{ 0c,09, <-!-> 03,04, }-> 08,00,0b,0f,0d,0e,02, }
get 0f: { <-{ 0c,09, <-!-> 0f,03,04, }-> 08,00,0b,0d,0e,02, }
get 05: { <-{ 0c,09,05, <-!-> 0f,03, }-> 04,08,00,0b,0d, }
get 0b: { <-{ 0c,09,05, <-!-> 0b,0f,03, }-> 04,08,00,0d, }
get 0f: { <-{ 0c,09,05, <-!-> 0f,0b,03, }-> 04,08,00,0d, }
get 01: { <-{ 0c,09,05,01, <-!-> 0f,0b,03, }-> 04,08,00,0d, }
get 07: { <-{ 0c,09,05,01,07, <-!-> 0f,0b, }-> 03,04,08,00, }
get 0f: { <-{ 0c,09,05,01,07, <-!-> 0f,0b, }-> 03,04,08,00, }
get 0a: { 0c, <-{ 09,05,01,07,0a, <-!-> 0f,0b, }-> 03,04,08, }
get 0f: { 0c, <-{ 09,05,01,07,0a, <-!-> 0f,0b, }-> 03,04,08, }
get 0c: { 09, <-{ 05,01,07,0a, <-!-> 0c,0f,0b, }-> 03,04,08, }
get 0f: { 09, <-{ 05,01,07,0a, <-!-> 0f,0c,0b, }-> 03,04,08, }
get 0d: { 09,05, <-{ 01,07,0a,0d, <-!-> 0f,0c,0b, }-> 03,04, }
get 02: { 09,05,01, <-{ 07,0a,0d,02, <-!-> 0f,0c,0b, }-> 03, }
get 0f: { 09,05,01, <-{ 07,0a,0d,02, <-!-> 0f,0c,0b, }-> 03, }
get 0f: { 09,05,01, <-{ 07,0a,0d,02, <-!-> 0f,0c,0b, }-> 03, }
get 09: { 05,01,07, <-{ 0a,0d,02, <-!-> 09,0f,0c,0b, }-> 03, }
get 0c: { 05,01,07, <-{ 0a,0d,02, <-!-> 0c,09,0f,0b, }-> 03, }
get 0f: { 05,01,07, <-{ 0a,0d,02, <-!-> 0f,0c,09,0b, }-> 03, }
get 05: { 01,07,0a, <-{ 0d,02, <-!-> 05,0f,0c,09,0b, }-> 03, }
get 0c: { 01,07,0a, <-{ 0d,02, <-!-> 0c,05,0f,09,0b, }-> 03, }
get 07: { 01,0a, <-{ 0d,02, <-!-> 07,0c,05,0f,09,0b, }-> 03, }
get 0e: { 01,0a, <-{ 0d,02,0e, <-!-> 07,0c,05,0f, }-> 09,0b,03, }
get 0b: { 01,0a, <-{ 0d,02,0e, <-!-> 0b,07,0c,05,0f, }-> 09,03, }
get 02: { 01,0a, <-{ 0d,0e, <-!-> 02,0b,07,0c,05,0f, }-> 09,03, }
get 05: { 01,0a, <-{ 0d,0e, <-!-> 05,02,0b,07,0c,0f, }-> 09,03, }
get 00: { 01,0a, <-{ 0d,0e,00, <-!-> 05,02,0b,07,0c, }-> 0f,09,03, }
get 00: { 01,0a, <-{ 0d,0e, <-!-> 00,05,02,0b,07,0c, }-> 0f,09,03, }
get 00: { 01,0a, <-{ 0d,0e, <-!-> 00,05,02,0b,07,0c, }-> 0f,09,03, }
get 0d: { 01,0a, <-{ 0e, <-!-> 0d,00,05,02,0b,07,0c, }-> 0f,09,03, }
get 03: { 01,0a, <-{ 0e, <-!-> 03,0d,00,05, }-> 02,0b,07,0c,0f,09, }
get 07: { 01,0a, <-{ 0e, <-!-> 07,03,0d,00, }-> 05,02,0b,0c,0f,09, }
get 05: { 01,0a, <-{ 0e, <-!-> 05,07,03, }-> 0d,00,02,0b,0c,0f,09, }
get 02: { 01,0a, <-{ 0e, <-!-> 02,05,07,03, }-> 0d,00,0b,0c,0f,09, }
get 01: { 0a, <-{ 0e, <-!-> 01,02,05,07,03, }-> 0d,00,0b,0c,0f,09, }
get 00: { 0a, <-{ 0e, <-!-> 00,01,02,05,07, }-> 03,0d,0b,0c,0f, }
get 02: { 0a, <-{ 0e, <-!-> 02,00,01,05,07, }-> 03,0d,0b,0c,0f, }
get 02: { 0a, <-{ 0e, <-!-> 02,00,01,05,07, }-> 03,0d,0b,0c,0f, }
get 03: { 0a, <-{ 0e, <-!-> 03,02,00,01,05, }-> 07,0d,0b,0c,0f, }
get 03: { 0a, <-{ 0e, <-!-> 03,02,00,01,05, }-> 07,0d,0b,0c,0f, }
get 02: { 0a, <-{ 0e, <-!-> 02,03,00,01,05, }-> 07,0d,0b,0c,0f, }
get 02: { 0a, <-{ 0e, <-!-> 02,03,00,01,05, }-> 07,0d,0b,0c,0f, }
get 03: { 0a, <-{ 0e, <-!-> 03,02,00,01,05, }-> 07,0d,0b,0c,0f, }
get 01: { 0a, <-{ 0e, <-!-> 01,03,02,00,05, }-> 07,0d,0b,0c,0f, }
get 01: { 0a, <-{ 0e, <-!-> 01,03,02,00,05, }-> 07,0d,0b,0c,0f, }
get 02: { 0a, <-{ 0e, <-!-> 02,01,03,00,05, }-> 07,0d,0b,0c,0f, }
get 00: { 0a, <-{ 0e, <-!-> 00,02,01,03,05, }-> 07,0d,0b,0c,0f, }
get 02: { 0a, <-{ 0e, <-!-> 02,00,01,03,05, }-> 07,0d,0b,0c,0f, }
get 02: { 0a, <-{ 0e, <-!-> 02,00,01,03,05, }-> 07,0d,0b,0c,0f, }
get 0f: { 0a, <-{ 0e, <-!-> 0f,02,00,01,03,05, }-> 07,0d,0b,0c, }
get 08: { 0a, <-{ 0e,08, <-!-> 0f,02,00,01,03, }-> 05,07,0d,0b, }
get 0a: { <-{ 0e,08, <-!-> 0a,0f,02,00,01, }-> 03,05,07,0d,0b, }
get 0a: { <-{ 0e,08, <-!-> 0a,0f,02,00,01, }-> 03,05,07,0d,0b, }
get 0d: { <-{ 0e,08, <-!-> 0d,0a,0f,02,00, }-> 01,03,05,07,0b, }
get 0b: { <-{ 0e,08, <-!-> 0b,0d,0a,0f,02,00, }-> 01,03,05,07, }
get 06: { <-{ 0e,08,06, <-!-> 0b,0d,0a,0f,02, }-> 00,01,03,05,07, }
get 0b: { <-{ 0e,08,06, <-!-> 0b,0d,0a,0f,02, }-> 00,01,03,05,07, }
get 03: { <-{ 0e,08,06, <-!-> 03,0b,0d, }-> 0a,0f,02,00,01,05,07, }
get 00: { <-{ 0e,08,06, <-!-> 00,03,0b,0d, }-> 0a,0f,02,01,05,07, }
get 02: { <-{ 0e,08,06, <-!-> 02,00,03,0b, }-> 0d,0a,0f,01,05, }
get 08: { <-{ 0e,06, <-!-> 08,02,00,03,0b, }-> 0d,0a,0f,01,05, }
get 03: { <-{ 0e,06, <-!-> 03,08,02,00,0b, }-> 0d,0a,0f,01,05, }
get 04: { <-{ 0e,06,04, <-!-> 03,08,02,00,0b, }-> 0d,0a,0f,01,05, }
```

-continued

```
get 05: { <-{ 0e,06,04, <-!-> 05,03, }->08,02,00,0b,0d,0a,0f,01, }
get 02: { <-{ 0e,06,04, <-!-> 02,05,03, }-> 08,00,0b,0d,0a,0f,01, }
get 08: { <-{ 0e,06,04, <-!-> 08,02,05, }-> 03,00,0b,0d,0a,0f, }
get 04: { <-{ 0e,06, <-!-> 04,08,02,05, }-> 03,00,0b,0d,0a,0f, }
get 0c: { <-{ 0e,06,0c, <-!-> 04,08,02,05, }-> 03,00,0b,0d,0a,0f, }
get 00: { <-{ 0e,06,0c, <-!-> 00,04,08,02,05, }-> 03,0b,0d,0a,0f, }
get 05: { <-{ 0e,06,0c, <-!-> 05,00,04,08,02, }-> 03,0b,0d,0a,0f, }
get 0b: { <-{ 0e,06,0c, <-!-> 0b,05,00,04,08,02, }-> 03,0d,0a,0f, }
get 05: { <-{ 0e,06,0c, <-!-> 05,0b,00,04,08,02, }-> 03,0d,0a,0f, }
get 0b: { <-{ 0e,06,0c, <-!-> 0b,05,00,04,08,02, }-> 03,0d,0a,0f, }
get 04: { <-{ 0e,06,0c, <-!-> 04,0b,05,00,08,02, }-> 03,0d,0a,0f, }
get 0f: { <-{ 0e,06,0c, <-!-> 0f,04,0b,05,00,08, }-> 02,03,0d,0a, }
get 0e: { <-{ 06,0c, <-!-> 0e,0f,04,0b,05,00,08, }-> 02,03,0d,0a, }
get 03: { <-{ 06,0c, <-!-> 03,0e,0f,04,0b, }-> 05,00,08,02,0d, }
get 07: { <-{ 06,0c,07, <-!-> 03,0e,0f, }-> 04,0b,05,00,08,02,0d, }
get 0e: { <-{ 06,0c,07, <-!-> 0e,03,0f, }-> 04,0b,05,00,08,02,0d, }
get 02: { <-{ 06,0c,07, <-!-> 02,0e,03,0f, }-> 04,0b,05,00,08,0d, }
get 03: { <-{ 06,0c,07, <-!-> 03,02,0e,0f, }-> 04,0b,05,00,08,0d, }
get 09: { <-{ 06,0c,07,09, <-!-> 03,02,0e, }-> 0f,04,0b,05,00,08,0d, }
get 00: { 06, <-{ 0c,07,09, <-!-> 00,03,02,0e, }-> 0f,04,0b,05,08,0d, }
get 04: { 06, <-{ 0c,07,09, <-!-> 04,00,03, }-> 02,0e,0f,0b,05,08,0d, }
get 0b: { 06, <-{ 0c,07,09, <-!-> 0b,04,00,03, }-> 02,0e,0f,05,08,0d, }
get 00: { 06, <-{ 0c,07,09, <-!-> 00,0b,04,03, }-> 02,0e,0f,05,08,0d, }
get 06: { <-{ 0c,07,09, <-!-> 06,00,0b,04, }-> 03,02,0e,0f,05,08, }
get 03: { <-{ 0c,07,09, <-!-> 03,06,00,0b, }-> 04,02,0e,0f,05,08, }
get 03: { <-{ 0c,07,09, <-!-> 03,06,00,0b, }-> 04,02,0e,0f,05,08, }
get 0a: { <-{ 0c,07,09,0a, <-!-> 03, }-> 06,00,0b,04,02,0e,0f,05,08, }
get 08: { 0c, <-{ 07,09,0a, <-!-> 08,03, }-> 06,00,0b,04,02,0e,0f,05, }
get 0c: { <-{ 07,09,0a, <-!-> 0c,08, }-> 03,06,00,0b,04,02,0e,0f, }
get 0b: { <-{ 07,09,0a, <-!-> 0b,0c,08, }->03,06,00,04,02,0e,0f, }
get 0d: { <-{ 07,09,0a,0d, <-!-> 0b,0c,08, }-> 03,06,00,04,02,0e,0f, }
get 0d: { <-{ 07,09,0a, <-!-> 0d,0b,0c,08, }-> 03,06,00,04,02,0e,0f, }
get 0d: { <-{ 07,09,0a, <-!-> 0d,0b,0c,08, }-> 03,06,00,04,02,0e,0f, }
get 0e: { <-{ 07,09,0a, <-!-> 0e,0d,0b,0c,08, }-> 03,06,00,04,02,0f, }
get 09: { <-{ 07,0a, <-!-> 09,0e,0d,0b,0c,08, }-> 03,06,00,04,02,0f, }
get 02: { <-{ 07,0a, <-!-> 02,09,0e,0d,0b,0c,08, }-> 03,06,00,04,0f, }
get 09: { <-{ 07,0a, <-!-> 09,02,0e,0d,0b,0c,08, }-> 03,06,00,04,0f, }
get 0d: { <-{ 07,0a, <-!-> 0d,09,02,0e,0d,0b,0c,08, }-> 03,06,00,04,0f, }
get 01: { <-{ 07,0a,01, <-!-> 0d,09,02,0e,0b, }-> 0c,08,03,06,00,04,0f, }
get 00: { <-{ 07,0a,01, <-!-> 00,0d,09,02,0e,0b, }-> 0c,08,03,06,04,0f, }
get 08: { 07, <-{ 0a,01, <-!-> 08,00,0d,09,02,0e,0b, }-> 0c,03,06,04, }
get 0d: { 07, <-{ 0a,01, <-!-> 0d,08,00,09,02,0e,0b, }-> 0c,03,06,04, }
get 0e: { 07, <-{ 0a,01, <-!-> 0e,0d,08,00,09,02,0b, }-> 0c,03,06,04, }
get 0a: { 07, <-{ 01, <-!-> 0a,0e,0d,08,00,09,02,0b, }-> 0c,03,06,04, }
get 00: { 07, <-{ 01, <-!-> 00,0a,0e,0d,08,09,02,0b, }-> 0c,03,06,04, }
get 07: { <-{ 01, <-!-> 07,00,0a,0e,0d,08, }-> 09,02,0b,0c,03,06,04, }
get 02: { <-{ 01, <-!-> 02,07,00,0a,0e,0d, }-> 08,09,0b,0c,03,06,04, }
get 00: { <-{ 01, <-!-> 00,02,07,0a,0e,0d, }-> 08,09,0b,0c,03,06,04, }
get 0b: { <-{ 01, <-!-> 0b,00,02,07,0a,0e,0d, }-> 08,09,0c,03,06,04, }
get 0d: { <-{ 01, <-!-> 0d,0b,00,02,07,0a,0e, }-> 08,09,0c,03,06,04, }
```

Figure 7:
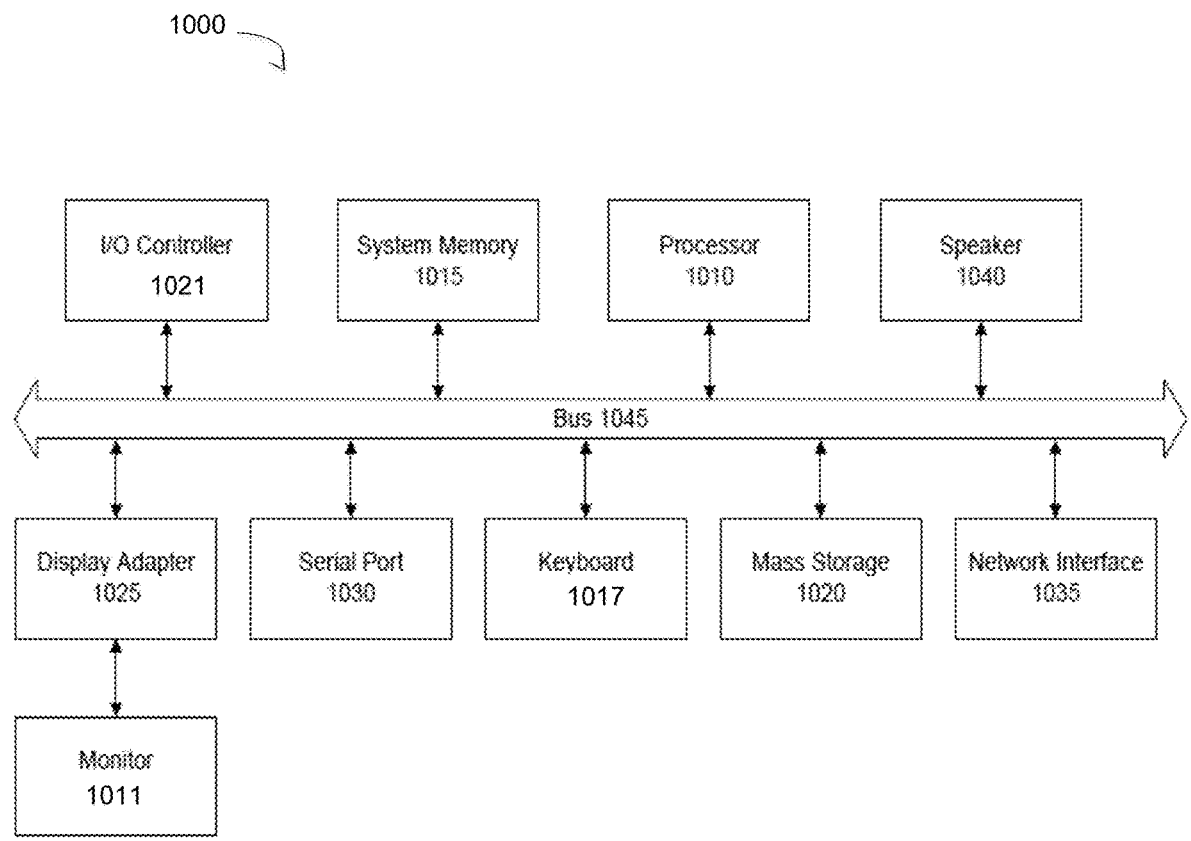
FIG. 7 is a block diagram of a computer system used to execute one or more software components of the ARC cache for DD Boost systems, under some embodiments.

As described above, in an embodiment, system 100 includes a client-side cache process that may be implemented as a computer implemented software process, or as a hardware component, or both. As such, it may be an executable module executed by the one or more computers in the network, or it may be embodied as a hardware component or circuit provided in the system. The network environment of FIG. 1 may comprise any number of individual client-server networks coupled over the Internet or similar large-scale network or portion thereof. Each node in the network(s) comprises a computing device capable of executing software code to perform the processing steps described herein. FIG. 7 is a block diagram of a computer system used to execute one or more software components of the described process, under some embodiments. The computer system 1000 includes a monitor 1011, keyboard 1017, and mass storage devices 1020. Computer system 1000 further includes subsystems such as central processor 1010, system memory 1015, input/output (I/O) controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1000. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1000 shown in FIG. 7 is an example of a computer system suitable for use with the present system. Other configurations of subsystems suitable for use with the present invention will be readily apparent to one of ordinary skill in the art.

Although embodiments have been described with respect to Data Domain Boost client side software, it is used as a reference only, and other protocols such as NFS (network file system) or SMB (server message block) can also use the client side ARC caching heuristics to improve performance.

Computer software products may be written in any of various suitable programming languages. The computer software product may be an independent application with data input and data display modules. Alternatively, the computer software products may be classes that may be instantiated as distributed objects. The computer software products may also be component software. An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Although certain embodiments have been described and illustrated with respect to certain example network topographies and node names and configurations, it should be understood that embodiments are not so limited, and any practical network topography is possible, and node names and configurations may be used. Likewise, certain specific programming syntax and data structures are provided herein. Such examples are intended to be for illustration only, and embodiments are not so limited. Any appropriate alternative language or programming convention may be used by those of ordinary skill in the art to achieve the functionality described.

Embodiments may be applied to data, storage, industrial networks, and the like, in any scale of physical, virtual or hybrid physical/virtual network, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network. The network may comprise any number of server and client computers and storage devices, along with virtual data centers (vCenters) including multiple virtual machines. The network provides connectivity to the various systems, components, and resources, and may be implemented using protocols such as Transmission Control Protocol (TCP) and/or Internet Protocol (IP), well known in the relevant arts. In a distributed network environment, the network may represent a cloud-based network environment in which applications, servers and data are maintained and provided through a centralized cloud-computing platform.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of performing client-side caching of data in a deduplication backup system having a deduplication backup server, comprising:
   providing a deduplication distribution component with each client and server of the deduplication backup system that sends only unique data segments to the deduplication server, and configured to store file path handles of the data segments;
   maintaining an Adaptive Replacement Cache (ARC) in a client coupled to a backup server of the deduplication backup system and associated with each deduplication distribution component to pre-populate cached data and to flush only changed data of the cached data in the client coupled to a backup server in the system, wherein the ARC is configured to use write-through semantics; and
   including a time-to-live (TTL) value for each entry of the cached data in the client, the TTL value specifying a period of time after which a corresponding entry will be flushed from the ARC to be repopulated to maintain cache consistency with a second client using the cached data.

2. The method of claim 1 wherein the ARC caches most frequently used (MFU) data blocks and most recently used (MRU) data blocks used by the client.

3. The method of claim 1 further comprising:
   storing fingerprints of the MFU and MRU data blocks in respective ghost lists associated with each of the MFU and MRU data to form ghost list most frequently used (GMFU) and ghost list most recently used (GMRU) data;
   pre-populating the ARC with the MFU and MRU data and associated GMFU and GMRU data after a flush operation by a first client upon request to use a common server file by a second client; and
   sending incremental data comprising only changed data as determined by the deduplication backup system from the ARC during a recall of a delegation granted to the first client.

4. The method of claim 1 wherein the TTL value comprises a discrete number of seconds.

5. The method of claim 1 further comprising,
   associating with each entry of the cached data in the client, a retry on stale entry mechanism to signal from the server when a cache entry is stale in the client due to change of a corresponding cache entry in the second client; and
   upon receipt of a stale entry signal from the server, obtaining an updated file handle entry from the server in the client and updating its respective cache.

6. The method of claim 3 wherein the ARC cache splits a cache directory into two lists (T1 and T2) respectively for the MRU and MFU entries.

7. The method of claim 6 further comprising extending each of the two lists with a respective ghost list (B1 and B2) attached to the bottom of each of the two lists.

8. The method of claim 7 wherein the ghost list contains a reference to respective entries in the cache and provides a mechanism to keep track of a history of recently evicted cache entries, wherein the reference comprises a fingerprint of data blocks stored in the cache.

9. The method of claim 8 wherein the ARC cache keeps track of both frequently used and recently used pages, and a recent eviction history for both the frequently used and recently used pages.

10. A system configured to perform client-side caching of data in a deduplication backup system having a deduplication backup server, comprising:
    a deduplication distribution component with each client and server of the deduplication backup system that sends only unique data segments to the deduplication server, and configured to store file path handles of the data segments;
    an Adaptive Replacement Cache (ARC) maintained in a client coupled to a backup server of the deduplication system and associated with each deduplication distribution component to pre-populate cached data and to flush only changed data of the cached data in the client, wherein the ARC is configured to use write-through semantics; and
    a cache consistency mechanism including a time-to-live (TTL) value for each entry of the cached data in the client, the TTL value specifying a period of time after which a corresponding entry will be flushed from the ARC to be repopulated to maintain cache consistency with a second client using the cached data.

11. The system of claim 10 wherein the ARC caches most frequently used (MFU) data blocks and most recently used (MRU) data blocks used by the client.

12. The system of claim 11 further comprising a component storing fingerprints of the MFU and MRU data blocks in respective ghost lists associated with each of the MFU and MRU data to form ghost list most frequently used (GMFU) and ghost list most recently used (GMRU) data; pre-populating the ARC with the MFU and MRU data and associated GMFU and GMRU data after a flush operation by a first client upon request to use a common server file by a second client; and sending incremental data comprising only changed data as determined by the deduplication backup system from the ARC during a during a recall of a delegation granted to the first client.

13. The system of claim 10 wherein the TTL value comprises a discrete number of seconds.

14. The system of claim 13 further comprising, a retry on stale entry mechanism associated with each entry of the cached data in the client, to signal from the server when a cache entry is stale in the client due to change of a corresponding cache entry in the second client; and upon receipt of a stale entry signal from the server, obtaining an updated file handle entry from the server in the client and updating its respective cache.

15. The system of claim 12 wherein the ARC cache splits a cache directory into two lists (T1 and T2) for recently and frequently referenced entries, and extends each of the two lists with a respective ghost list (B1 and B2) attached to the bottom of each of the two lists.

16. The system of claim 15 wherein the ghost list contains a reference to respective entries in the cache and provides a mechanism to keep track of a history of recently evicted cache entries.

17. The system of claim 16 wherein the ARC cache keeps track of both frequently used and recently used pages, and a recent eviction history for both the frequently used and recently used pages.

18. A computer program product, comprising a non-transitory computer-readable medium having a computer-readable program code embodied therein, the computer-readable program code adapted to be executed by one or more processors to implement a method for performing client-side caching of data in a deduplication backup system having a deduplication backup server, by:

providing a deduplication distribution component with each client and server of the deduplication backup system that sends only unique data segments to the deduplication server, and configured to store file path handles of the data segments;

maintaining an Adaptive Replacement Cache (ARC) in a client coupled to a backup server of the deduplication backup system and associated with each deduplication distribution component to pre-populate cached data and to flush only changed data of the cached data in the client coupled to a backup server in the system, wherein the ARC is configured to use write-through semantics; and including a time-to-live (TTL) value for each entry of the cached data in the client, the TTL value specifying a period of time after which a corresponding entry will be flushed from the ARC to be repopulated to maintain cache consistency with a second client using the cached data.

19. The computer program product of claim 18 wherein the TTL value comprises a discrete number of seconds, and further comprising associating with each entry of the cached data in the client, a retry on stale entry mechanism to signal from the server when a cache entry is stale in the client due to change of a corresponding cache entry in the second client, and upon receipt of a stale entry signal from the server, obtaining an updated file handle entry from the server in the client and updating its respective cache.

20. The computer program product of claim 19 wherein the ARC caches most frequently used (MFU) data blocks and most recently used (MRU) data blocks used by the client, and the method further comprises:

storing fingerprints of the MFU and MRU data blocks in respective ghost lists associated with each of the MFU and MRU data to form ghost list most frequently used (GMFU) and ghost list most recently used (GMRU) GMFU and GMRU data;

pre-populating the ARC with the MFU and MRU data and associated GMFU and GMRU data after a flush operation by a first client upon request to use a common server file by a second client; and sending incremental data comprising only changed data as determined by the deduplication backup system from the ARC during a recall of a delegation granted to the first client.

* * * * *